United States Patent

Oh

(10) Patent No.: US 9,365,157 B2
(45) Date of Patent: Jun. 14, 2016

(54) SYSTEM FOR ADJUSTING BRIGHTNESS OF VEHICLE LIGHTING, VEHICLE HAVING THE SAME, AND CONTROL METHOD THEREOF

(71) Applicant: HYUNDAI MOTOR COMPANY, Seoul (KR)

(72) Inventor: Wontaek Oh, Suwon-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/563,971

(22) Filed: Dec. 8, 2014

(65) Prior Publication Data

US 2016/0101725 A1  Apr. 14, 2016

(30) Foreign Application Priority Data

Oct. 8, 2014  (KR) .................. 10-2014-0135623

(51) Int. Cl.
*B60L 1/14* (2006.01)
*B60Q 3/04* (2006.01)
*B60K 37/04* (2006.01)

(52) U.S. Cl.
CPC ........... *B60Q 3/048* (2013.01); *B60K 37/04* (2013.01); *B60K 2350/203* (2013.01); *B60K 2350/2069* (2013.01)

(58) Field of Classification Search
USPC ........ 362/487, 488, 543, 544; 307/10.1, 10.8; 315/77, 80, 149, 152
See application file for complete search history.

(56) References Cited

U.S. PATENT DOCUMENTS 5,938,321 A * 8/1999 Bos .................. B60Q 3/001
362/140

7,362,217 B2 * 4/2008 Woo .................. B60Q 3/0293
315/79
2011/0241545 A1 * 10/2011 Miller ................... B60Q 3/048
315/82

FOREIGN PATENT DOCUMENTS

| JP | H07-186828 A | 7/1995 |
|---|---|---|
| JP | 2001-260707 A | 9/2001 |
| JP | 2011-068271 A | 4/2011 |
| KR | 2002-0097372 A | 12/2002 |
| KR | 10-2004-0026474 A | 3/2004 |
| KR | 2004-0110919 A | 12/2004 |
| KR | 10-0644447 | 11/2006 |
| KR | 10-2014-0021942 A | 2/2014 |

OTHER PUBLICATIONS

Office Action issued in corresponding Korean Patent Application No. 10-2014-0135623, dated Jan. 21, 2016.

* cited by examiner

*Primary Examiner* — Thuy Vinh Tran
(74) *Attorney, Agent, or Firm* — McDermott Will & Emery LLP

(57) ABSTRACT

A vehicle having a light in an exterior and a cluster and a center fascia in an interior includes a first lighting unit provided in the cluster, a second lighting unit provided in the center fascia, a recognizer configured to recognize ON and OFF operations of the light, a detector configured to detect illuminance, and a controller configured to adjust luminance of the first and second lighting units based on operation information of the light and the illuminance. A structure of the lighting unit within the center fascia may be simplified by adjusting brightness of the lighting unit within the center fascia in the controller configured to control the lighting unit of the cluster and therefore manufacturing cost may be reduced.

17 Claims, 12 Drawing Sheets

FIG. 11

| INPUT | | | OUTPUT |
|---|---|---|---|
| Rheo Max | LIGHT | ILLUMINANCE | ILL_Max |
| ON | D/C | D/C | ON |
| OFF | OFF | D/C | ON |
| OFF | ON | DAYTIME | ON |
| OFF | ON | NIGHTTIME | OFF |

FIG. 12

| INPUT ILL_Max | BRIGHTNESS STATE |
|---|---|
| ON | DAYTIME BRIGHTNESS (MAXIMUM LUMINANCE) |
| OFF | NIGHTTIME BRIGHTNESS (REDUCED LUMINANCE) |

SYSTEM FOR ADJUSTING BRIGHTNESS OF VEHICLE LIGHTING, VEHICLE HAVING THE SAME, AND CONTROL METHOD THEREOF

CROSS-REFERENCE TO RELATED APPLICATION

This application claims the benefit of priority to Korean Patent Application No. P2014-135623, filed on Oct. 8, 2014 in the Korean Intellectual Property Office, the disclosure of which is incorporated herein by reference entirely.

TECHNICAL FIELD

The present disclosure relates to a system for adjusting brightness of vehicle lighting, a vehicle having the same, and a control method thereof.

BACKGROUND

A vehicle includes a cluster configured to display driving functions, such as a vehicle speed, an engine speed, a refueling amount, a coolant, and the like and vehicle information.

In addition, the cluster includes further a brake warning lamp, a seat belt warning lamp, an anti-lock brake system (ABS) warning lamp, a traction control system (TCS) warning lamp, and other lamps configured to indicate operation states and warning states of attached systems within the vehicle.

In the cluster of the vehicle, a liquid crystal display (LCD) is mounted to improve display efficiency of various types of information. In addition, various buttons for an audio, a full automatic temperature control (FATC) system, and an emergency lamp are arranged in a center fascia of the vehicle. Here, a lighting device is embedded for visual recognition of a driver when the vehicle is driven at night or in a dark place.

Because the driver should be able to easily and clearly view all information of the vehicle while staring a front sight for safety driving, the vehicle further includes a rheostat switch capable of adjusting brightness of the lighting device.

In lighting adjustment according to this rheostat switch, the brightness of lighting may be adjusted by receiving an input of only a duty variable value at a fixed frequency of the rheostat switch and performing an output to a light-emitting diode (LED) at the same ratio. That is, the rheostat switch adjusts a light reduction amount by control of a duty ratio of an ILL(−) port through a transistor (Tr).

The brightness of the lighting device is adjusted through the adjustment of the rheostat switch and the control of the duty ratio of the ILL(−) port. When ON is made by an ignition key IG+ which is a start switch, a constant voltage of 9V is applied.

On the other hand, an operation mode of the lighting device for the cluster of the vehicle is divided into a daytime mode and a nighttime mode. When a taillight (tail) switch is turned on, primary light reduction (referred to as tail light reduction) to about 80% of brightness in daytime is performed.

Accordingly, there is a problem in that visibility is degraded because the light reduction to a brightness of about 80% as in the nighttime mode is performed in spite of daytime when the driver drives the vehicle while operating the taillight switch in a region which the vehicle is driven in a state in which the light is turned on even in daytime.

In addition, because a determination for light reduction conditions is to be made in parts (for example, an audio, an air conditioner, a switch indicator, and the like) to be controlled in a light reduction scheme for an audio, an FATC system, an LCD, various types of lamps, and the like in current vehicles, there is a problem in that a logic or circuit is not simple compared to functions.

SUMMARY

An aspect of the present inventive concept provides a system for adjusting brightness of vehicle lighting within a center fascia based on the brightness of the lighting device within a cluster and a control method thereof.

Another aspect of the present inventive concept provides a vehicle capable of adjusting brightness of a lighting unit within a cluster based on an ON/OFF state of a headlight and a daytime/nighttime mode and a control method thereof.

Additional aspects of the inventive concept will be set forth in part in the description which follows and, in part, will be obvious from the description, or may be learned by practice of the disclosure.

In accordance with an exemplary embodiment of the present inventive concept, a system for adjusting brightness of vehicle lighting includes a first lighting unit provided in a cluster. A second lighting unit is provided in a center fascia. A recognizer is configured to recognize ON and OFF operations of the light. A detector is configured to detect an illuminance. A controller is configured to adjust a luminance of the first and second lighting units based on operation information of the light and the illuminance.

The controller may adjust the luminance of the first and second lighting units to a maximum luminance when the light is in an ON operation state and the detected illuminance is greater than or equal to a reference illuminance.

The controller may adjust the luminance of the first and second lighting units to a maximum luminance when the light is in an OFF operation state.

The vehicle may further include a luminance input configured to receive an input of a target luminance of the first lighting unit.

The controller may adjust the luminance of the first and second lighting units to a maximum luminance when the target luminance is the maximum luminance.

The controller may adjust the luminance of the first and second lighting units to the target luminance when the light is in an ON operation state and the detected illuminance is less than a reference illuminance.

The controller may output an adjustment signal corresponding to the maximum luminance to the second lighting unit when the luminance of the first lighting unit is the maximum luminance and output an adjustment signal corresponding to luminance reduced by a predetermined magnitude to the second lighting unit when the luminance of the first lighting unit is the reduced luminance.

The second lighting unit may be adjusted to the maximum luminance when the luminance of the first lighting unit is the maximum luminance, and the second lighting unit may be adjusted to the reduced luminance when the luminance of the first lighting unit is the reduced luminance.

In accordance with another exemplary embodiment of the present invention, a vehicle having a system for adjusting brightness of vehicle lighting includes a detector configured to detect an illuminance. A cluster has a first lighting unit and is configured to receive ON and OFF operation information of light and the illuminance, to determine an luminance of the first lighting unit based on the received light operation information and the illuminance, to control the first lighting unit to the determined luminance, and to output an adjustment signal corresponding to the determined luminance. A second lighting unit is configured to adjust the luminance based on the adjustment signal output from the cluster.

The second lighting unit may be provided in a center fascia.

The cluster may receive the ON and OFF operation information of the light and the illuminance using controller area network (CAN) communication.

The cluster may adjust the luminance of the first lighting unit to a maximum luminance when the light is in an ON operation state and the detected illuminance is greater than or equal to a reference illuminance.

The cluster may adjust the luminance of the first lighting unit to a maximum luminance when the light is in an OFF operation state.

The vehicle may further include a luminance input configured to receive an input of a target luminance of the first lighting unit.

The cluster may the luminance of the first lighting unit to a maximum luminance when the target luminance is the maximum luminance.

The cluster may adjust the luminance of the first lighting unit to the target luminance when the light is in an ON operation state and the detected illuminance is less than a reference illuminance.

The cluster may output an adjustment signal corresponding to the maximum luminance to the second lighting unit when the luminance of the first lighting unit is a maximum luminance, and output an adjustment signal corresponding to luminance reduced by a predetermined magnitude to the second lighting unit when the luminance of the first lighting unit is the reduced luminance.

The vehicle may further include a third lighting unit configured to supply light to a character engraved on each of a plurality of buttons on the third lighting unit. The cluster outputs an OFF signal to the third lighting unit when the detected illuminance is greater than or equal to a reference illuminance, and outputs an ON signal to the third lighting unit when the detected illuminance is less than the reference illuminance.

The cluster may output an adjustment signal corresponding to the maximum luminance to the second lighting unit when the detected illuminance is greater than or equal to a reference illuminance, and output an adjustment signal corresponding to a luminance lower than the maximum luminance to the second lighting unit when the detected illuminance is less than the reference illuminance.

In accordance with still another exemplary embodiment of the present inventive concept, a control method of a vehicle includes receiving operation information of light and a detected illuminance. A luminance of a first lighting unit provided in a cluster is adjusted based on the operation information of the light and the detected illuminance. An adjustment signal corresponding to the adjusted luminance of the first lighting unit is output to a second lighting unit provided in a center fascia.

The step of outputting the adjustment signal may include comparing the detected illuminance to a reference illuminance. An adjustment signal corresponding to a maximum luminance is output to the second lighting unit when the detected illuminance is greater than or equal to the reference illuminance. An adjustment signal corresponding to a luminance lower than the maximum luminance is output to the second lighting unit when the detected illuminance is less than the reference illuminance.

The step of adjusting the luminance of the first lighting unit may include adjusting the luminance of the first lighting unit to a maximum luminance when the light is in an ON operation state and the detected illuminance is greater than or equal to a reference illuminance.

The step of adjusting the luminance of the first lighting unit may include adjusting the luminance of the first lighting unit to a maximum luminance when the light is in an OFF operation state.

The step of adjusting the luminance of the first lighting unit may include receiving an input of target luminance. The luminance of the first lighting unit is adjusted to a maximum luminance when the target luminance is the maximum luminance.

The step of adjusting the luminance of the first lighting unit may include adjusting the luminance of the first lighting unit to the target luminance when the light is in an ON operation state and the detected illuminance is less than a reference illuminance.

According to the present disclosure, a structure of a lighting unit within the center fascia may be simplified by adjusting brightness of the lighting unit within the center fascia in the controller configured to control a lighting unit of the cluster, and therefore, manufacturing cost is reduced.

Because the controller of the cluster determines the luminance of a lighting unit within the center fascia based on ON/OFF of a headlight, daytime and nighttime detection, and a target luminance, it is not necessary to provide an ON/OFF detection signal of the headlight to the lighting unit within the center fascia.

In addition, it is possible to implement anti-glare by reducing the brightness of a lighting unit provided in the center fascia at night and improve visibility by maximizing the brightness of the lighting unit provided in the center fascia in daytime.

Accordingly, it is possible to improve merchantable quality of the vehicle and improve safety of the driver.

BRIEF DESCRIPTION OF THE DRAWINGS

These and/or other aspects of the invention will become apparent and more readily appreciated from the following description of the embodiments, taken in conjunction with the accompanying drawings.

FIGS. 11 and 12 are signal inputs/outputs of the controller and the second lighting unit of the vehicle according to the exemplary embodiment of the inventive concept.

DETAILED DESCRIPTION

Hereinafter, the present disclosure will be described in detail with reference to the accompanying drawings.

Figure 1:
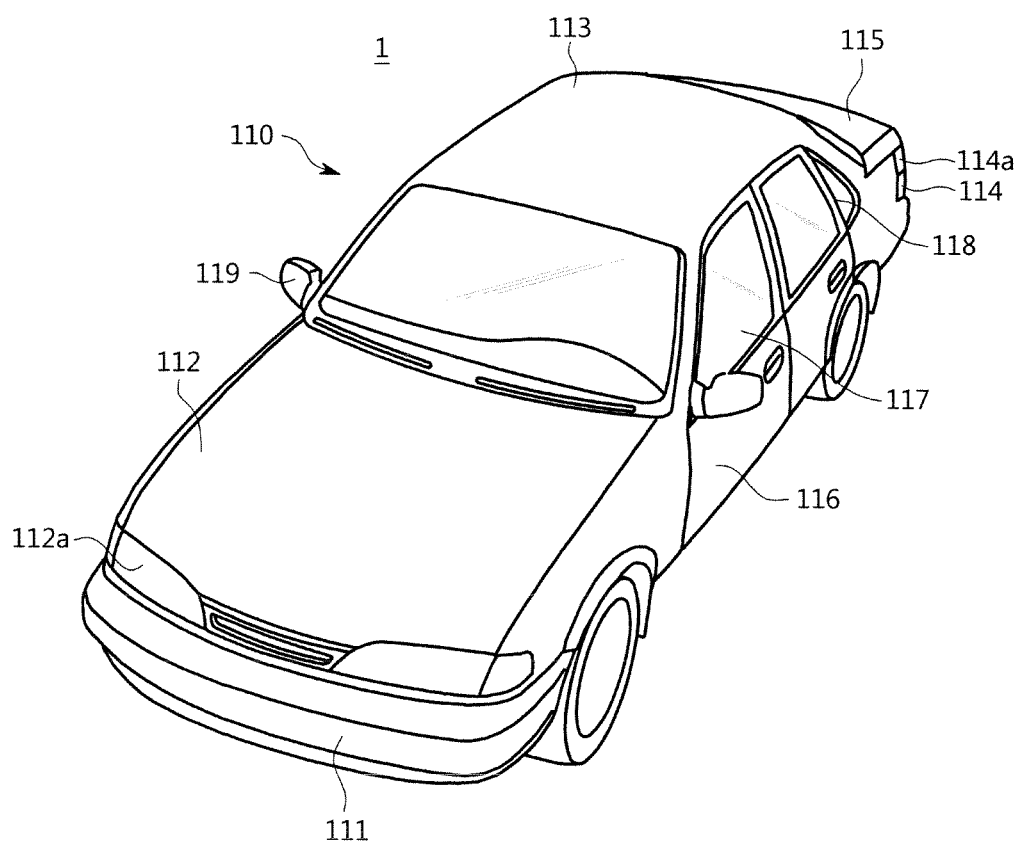
FIG. 1 is a diagram of an exterior of a vehicle according to an exemplary embodiment of the inventive concept.
Figure 2:
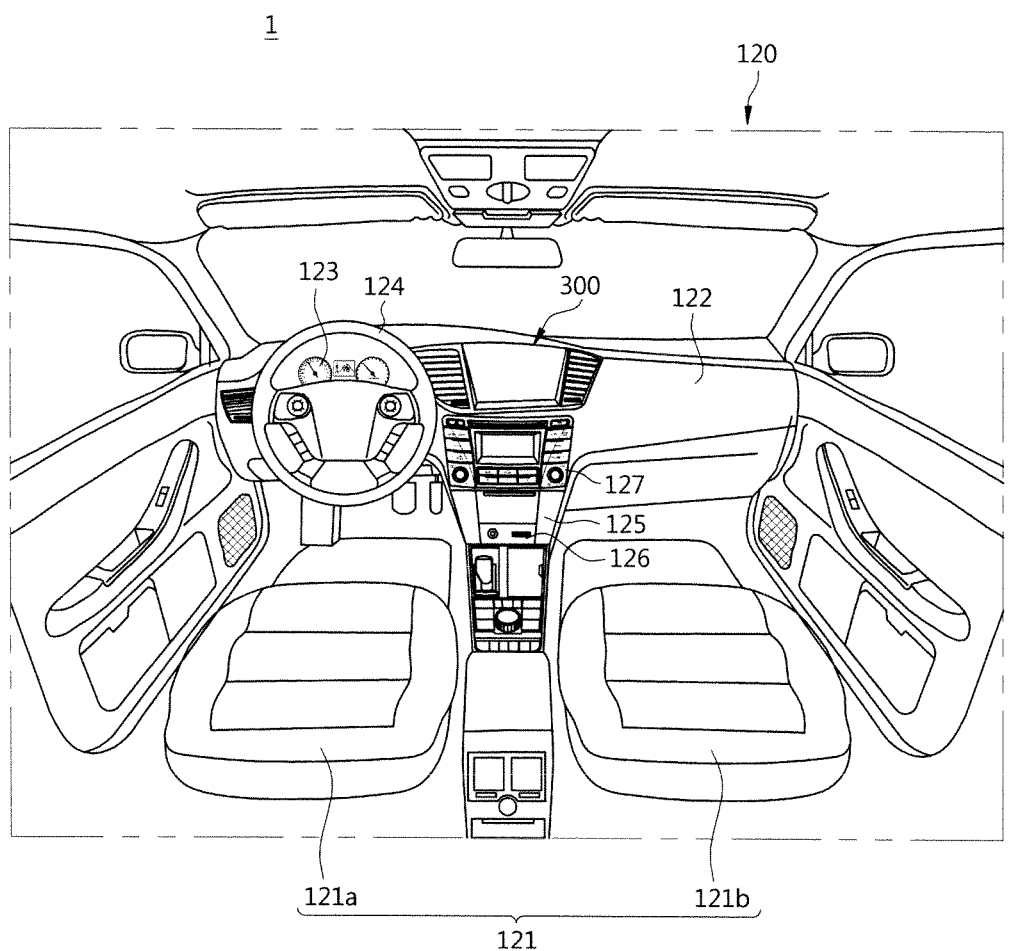
FIG. 2 is a diagram of an interior of the vehicle according to the exemplary embodiment of the inventive concept.

FIG. 1 is a diagram of an exterior of a vehicle according to an exemplary embodiment of the inventive concept, and FIG. 2 is a diagram of an interior of the vehicle according to the exemplary embodiment of the inventive concept.

A vehicle 1 is a device which drives wheels and moves on roads as the purpose of transporting humans or goods.

The vehicle 1 includes a body 110 having an interior and an exterior and a chassis on which mechanical devices necessary for driving are installed as the remaining parts except for the body 110.

As illustrated in FIG. 1, the exterior of the body 110 includes a front panel 111, a hood 112, a roof panel 113, a rear panel 114, a trunk 115, and front, rear, left, and right doors 116, and the like.

In addition, the exterior of the body 110 further includes window glasses 117 installed on the front, rear, left, and right doors 116 and pillars 118 provided in boundaries between the window glasses 117.

In addition, the window glasses 117 include a quarter window glass installed between the pillars 118 so that opening/closing is disabled, a rear window glass installed on a rear side, and a front window glass installed on a front side.

The exterior of the body 110 further includes side mirrors 119 for providing a driver with a field of view in a rear direction of the vehicle 1 and the like.

In addition, the vehicle further includes a headlight 112a provided in the hood 112 and configured to output light in a front direction of the road and a taillight 114a provided in the rear panel 114 and configured to output light in a rear direction of the road.

The chassis of the vehicle further includes a power generating device, a power transfer device, a driving device, a steering device, a braking device, a suspension device, a speed change device, a fuel device, front, rear, left, and right wheels, and the like.

The vehicle 1 further includes various safety devices for safety of the driver and a passenger.

As the safety devices of the vehicle 1, there are various safety devices such as an airbag control device for the safety of the driver and the passenger at the time of a vehicle collision and an electronic stability control (ESC) device for stabilizing a posture of the vehicle at the time of acceleration or cornering of the vehicle.

In addition, the vehicle 1 may further include sensing devices, such as a proximity sensor for sensing an obstacle or another vehicle in a rear or lateral direction, a rain sensor for sensing precipitation and an amount of precipitation, a temperature sensor for sensing indoor and outdoor temperatures, and the like.

The vehicle 1 includes an electronic controller (ECU) for controlling the actuation of the power generating device, the power transfer device, the driving device, the steering device, the braking device, the suspension device, the speed change device, the fuel device, the safety devices, and various sensors.

The vehicle 1 may selectively include a hands-free device, a global positioning system (GPS) device, an audio device, a Bluetooth device, a rear camera, a charging device, and a high-pass device installed for convenience of the driver.

This vehicle 1 may further include a starter button for inputting an operation command to a starter motor (not illustrated).

That is, when the starter button is turned on, the vehicle 1 operates the starter motor (not illustrated) and drives an engine (not illustrated) which is the power generating device through an operation of the starter motor.

The vehicle 1 further includes a battery (not illustrated) electrically connected to the terminal device, the audio device, the indoor lighting device, the starter motor, and the other electronic devices and configured to supply actuating power.

This battery is charged using a self-generator or the engine's power during driving.

As illustrated in FIG. 2, the interior 120 of the body 110 includes seats 121 (121a and 121b) in which passengers sit, a dash board 122, a cluster (that is, an instrument board 123) arranged on the dash board 122 and provide a guide of driving functions of a vehicle speed, an engine speed, a refueling amount, a coolant, and the like and vehicle information, a steering wheel 124 for operating a vehicle direction, and a center fascia 125 on which a control panel for the audio device and the air conditioning device is arranged.

More specifically, the seats 121 include a driver's seat 121a in which a driver sits, a passenger seat 121b in which a fellow passenger sits, and a rear seat positioned in the rear direction within the vehicle.

The cluster 123 may be implemented in a digital scheme. The cluster of the digital scheme displays an image of vehicle information and traveling information.

An air outlet, a cigar jack, and the like may be installed in the center fascia 125.

In addition, an interface device 126 configured to perform data communication between a terminal device 300 and an external device (not illustrated) is provided in the center fascia 125.

Here, the external device includes a storage device, a mobile communication terminal device, a moving picture experts group (MPEG) audio layer-3 (MP3) player, and the like.

The center fascia 125 has a head unit 127 positioned between the driver's seat 121a and the passenger seat 121b in the dash board 122 and configured to control the audio device, the air conditioning device, the Bluetooth device, the hot wire of the seat, and the like.

Figure 3:
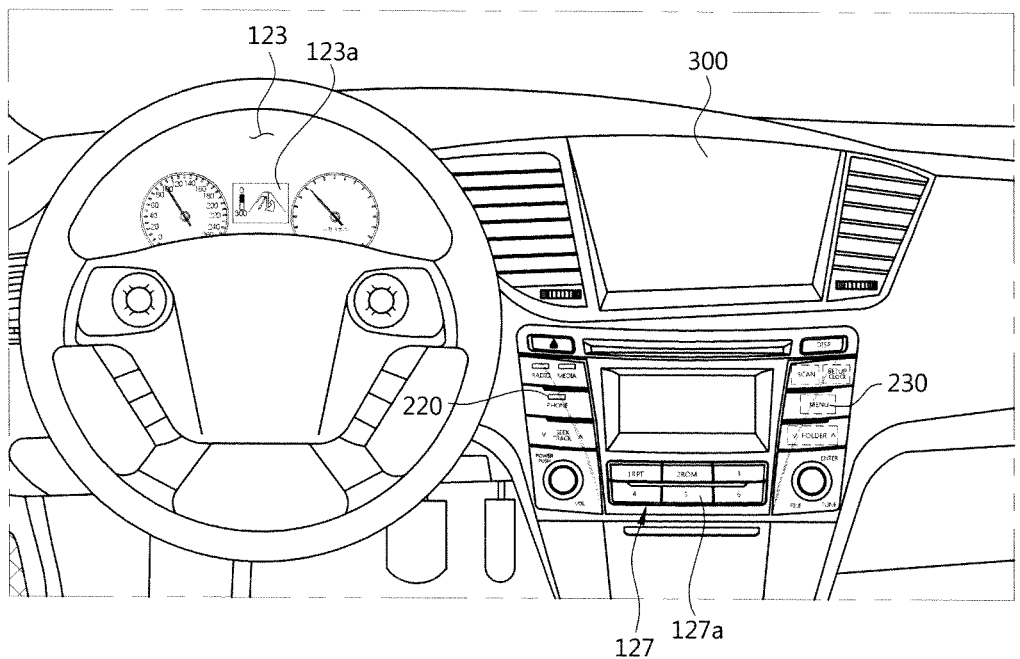
FIG. 3 is a detailed diagram of a cluster and a center fascia of the vehicle according to the exemplary embodiment of the inventive concept.

Referring to FIG. 3, the cluster 123 and the head unit 127 will be more specifically described.

The cluster 123 includes a first lighting unit 210 having a coolant thermometer indicator lamp, a fuel gauge indicator lamp, a direction indicator lamp, a high beam indicator lamp, a warning lamp, a seat belt warning lamp, a distance recorder, an odometer, an automatic speed change selection lever indicator lamp, a door open warning lamp, an engine oil warning lamp, and a fuel shortage warning lamp.

The cluster 123 is provided with an LCD (display panel) 123a for improving information providing efficiency of various types of information.

The first lighting unit 210 may further include a lamp for adjusting the brightness of the display panel 123a.

In addition, the cluster 123 may further include character lighting units such as a character indicator lamp and a speed meter character indicator lamp of a tachometer.

The head unit 127 may include a plurality of buttons 127a configured to receive an input of a command of a user for controlling the audio device, the air conditioning device, the Bluetooth device, the hot wire of the seat, and the like.

The head unit 127 includes a second lighting unit 220 provided in at least one of the plurality of buttons and having a lamp configured to indicate an operation state of a function corresponding to the button.

Here, the operation state of the function includes an ON state and an OFF state. At this time, the lamp of the second lighting unit 220 may be turned on or off in correspondence with the operation state of the function.

The head unit 127 includes a third lighting unit 230 provided on each of a plurality of buttons and having a lamp for outputting light so as to improve visibility of a character engraved on each button.

Here, in the second lighting unit 220 and the third lighting unit 230, the brightness and ON/OFF of the lamp are controlled based on the operation state of the first lighting unit 210. A configuration for this will be specifically described later.

In addition, the vehicle 1 further includes a terminal device 300 for integrally performing a digital multimedia broadcasting (DMB) function, an audio function, a video function, a navigation function, and the like.

That is, the terminal device 300 installed in the vehicle may be a navigation (audio/video/navigation (AVN)) device or a mobile communication device in which a navigation app is installed.

The terminal device 300 may be installed in the center fascia 125 in an embedded type or installed on the dash board 122 in a mounted type.

This terminal device 300 includes an input for receiving an input of a user command, a display unit for displaying operation information, and a controller for controlling an operation of the display unit in correspondence with the input user command.

The display unit of the terminal device 300 may be implemented by a flat display panel such as an LCD, a plasma display panel (PDP), or an organic light-emitting diode (OLED).

The input of the terminal device 300 further includes a touch panel integrally formed with the flat display panel and may be implemented in a touch screen form.

That is, the input and the display unit of the terminal device 300 may be implemented in a touch screen.

Also, the brightness of the display unit of the terminal device 300 may be adjusted based on the operation state of the first lighting unit 210.

Figure 4:
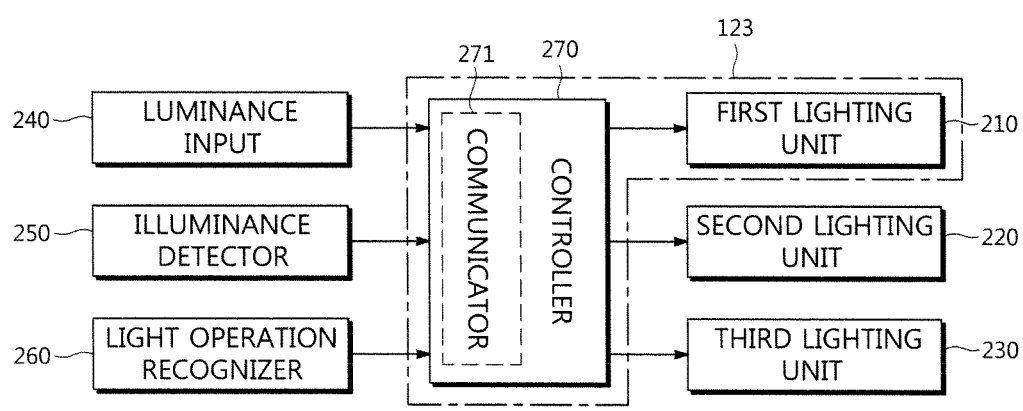
FIG. 4 is a control configuration diagram of the vehicle according to the exemplary embodiment of the inventive concept.

FIG. 4 is a control configuration diagram of the vehicle according to the embodiment, and the vehicle includes the first lighting unit 210, the second lighting unit 220, the third lighting unit 230, a luminance input 240, an illuminance detector 250, a light operation recognizer 260, and a controller 270.

The first lighting unit 210 is provided in the cluster 123, and includes an icon lamp, a warning lamp, and an indicator lamp for indicating various types of information within the cluster.

Based on an operation command of the controller 270, the first lighting unit 210 adjusts luminance of the lamp to maximum luminance or adjusts the luminance of the lamp to lower luminance than the maximum luminance.

Here, the lower luminance than the maximum luminance may be target luminance selected by the user.

In addition, the lower luminance than the maximum luminance may be luminance corresponding to the detected illuminance.

The second lighting unit 220 is provided on a plurality of buttons provided in the center fascia 125 and includes a lamp for indicating operation information of each function.

For example, the second lighting unit 220 may indicate operation information such as ON/OFF of the air conditioning device and ON/OFF of the radio through the ON/OFF operation of the lamp.

This second lighting unit 220 adjusts the luminance based on an adjustment signal transmitted from the controller 270.

The third lighting unit 230 is provided in the plurality of buttons provided in the center fascia 125 and includes a lamp for improving visibility of a character engraved on each button.

For example, the third lighting unit 230 causes the character engraved on the button to be favorably viewed by turning on the lamp at night.

This third lighting unit 230 is turned on or off based on the adjustment signal transmitted from the controller 270.

The luminance input 240 receives an input of target luminance of the first lighting unit 210.

The user may adjust lighting brightness of the first lighting unit 210.

Figure 5:
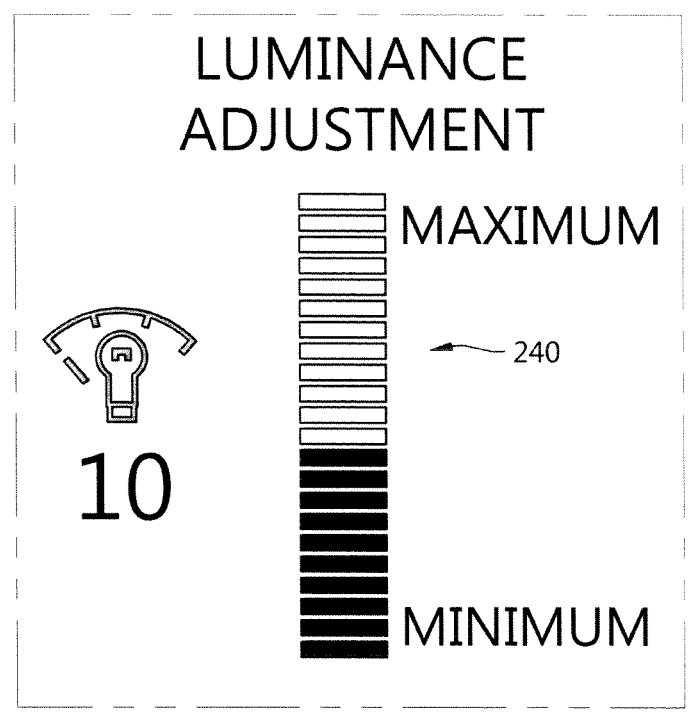
FIG. 5 is a diagram of luminance adjustment of a luminance input provided in the vehicle according to the exemplary embodiment of the inventive concept.

At this time, the luminance of the first lighting unit 210 to be adjusted by the user may be displayed through the display panel 123a provided in the cluster (see FIG. 5).

Here, the luminance of the first lighting unit 210 may be adjusted by rotating a knob provided inside the vehicle, pushing a button provided inside the vehicle, or touching a screen.

Also, it is possible to indicate the luminance of the first lighting unit 210 to be adjusted by the user using the terminal device 300.

The illuminance detector 250 detects external illuminance.

The light operation recognizer 260 recognizes whether the headlight 112a or taillight 114a is in an ON or OFF operation state.

The controller 270 adjusts the luminance of the first lighting unit 210 based on the target luminance, the detected illuminance, and the operation information of the light received through the CAN communication, and outputs an adjustment signal corresponding to the adjusted luminance to the second lighting unit 220.

This controller 270 serves as a controller for controlling the cluster 123 and mainly controls the first lighting unit 210.

The controller 270 may include a communicator 271 in which CAN communication is internally enabled and may communicate with an externally provided CAN communication module.

The controller 270 controls the lights 112a and 114a to be automatically turned on based on the detected illuminance.

That is, the controller 270 controls the lights 112a and 114a to be turned on by determining the operation mode as a nighttime mode when the detected illuminance is less than reference illuminance, and controls the lights 112a and 114a to be turned off by determining the operation mode as a daytime mode when the illuminance is greater than or equal to the reference illuminance.

The controller 270 outputs an OFF signal to the third lighting unit 230 by determining the operation mode as the daytime mode when the illuminance is greater than or equal to the reference illuminance, and outputs an ON signal to the third lighting unit 230 by determining the operation mode as the nighttime mode when the detected illuminance is less than reference illuminance.

The controller 270 controls the character lighting unit (not illustrated) of the cluster to be turned off by determining the operation mode as the daytime mode when the illuminance is greater than or equal to the reference illuminance, and controls the character lighting unit (not illustrated) of the cluster to be turned on by determining the operation mode as the nighttime mode when the detected illuminance is less than reference illuminance.

The controller 270 receives ON/OFF operation information of the light and illuminance, determines the luminance of the first lighting unit 210 based on the received ON/OFF operation information of the light and the received illuminance, controls the first lighting unit 210 using the determined luminance, and outputs an adjustment signal corresponding to the determined luminance.

Here, the light is the headlight 112a or taillight 114a.

More specifically, the controller 270 adjusts the luminance of the first lighting unit 210 to the maximum luminance when the light is in the ON operation state and the detected illuminance is greater than or equal to the reference illuminance.

The controller 270 adjusts the luminance of the first lighting unit 210 to the maximum luminance when the light is in the OFF operation state.

The controller 270 adjusts the luminance of the first lighting unit 210 to the maximum luminance when the target luminance is the maximum luminance.

The controller 270 adjusts the luminance of the first lighting unit 210 to the target luminance when the light is in the ON operation state and the detected illuminance is less than the reference illuminance.

Figure 6:
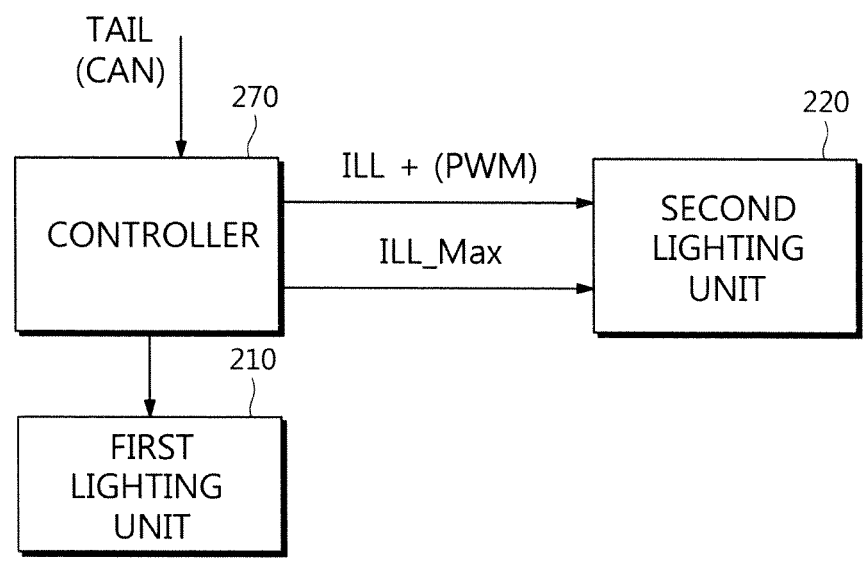
FIG. 6 is a diagram of an adjustment signal output of a controller of the vehicle according to the exemplary embodiment of the inventive concept.

As illustrated in FIG. 6, the controller 270 may receive the operation information of the light through the CAN communication.

Since the controller 270 of the cluster outputs a luminance adjustment signal based on the light operation information to the second lighting unit 220 after receiving the light operation information, it is not necessary to perform a control operation for luminance control in the second lighting unit 220.

Accordingly, the configuration of the second lighting unit 220 may be simplified because the configuration for light operation information reception of the second lighting unit 220 may be omitted.

In addition, the controller 270 adjusts the luminance of the first lighting unit 210 based on the received light operation information, detected illuminance, and target luminance, and outputs an adjustment signal corresponding to the luminance of the first lighting unit 210 to the second lighting unit 220.

That is, the controller 270 outputs an adjustment signal ILL_MAX corresponding to the maximum luminance to the second lighting unit 220 when the luminance of the first lighting unit 210 is the maximum luminance and outputs an adjustment signal ILL+PWM corresponding to luminance reduced by a given magnitude to the second lighting unit 220 when the luminance of the first lighting unit 210 is the luminance reduced by the given magnitude.

Here, the adjustment signal corresponding to the reduced luminance is a signal for outputting light of target luminance input by the user or preset target luminance, and is a duty pulse signal in which a duty ratio of an input current or voltage is adjusted.

An example in which a circuit of the controller 270 for adjusting the luminance of the second lighting unit 220 is implemented will be described with reference to FIGS. 7 and 8.

In addition, an implementation example of a circuit of the second lighting unit 220, the luminance of which is adjusted based on the adjustment signal transmitted from the controller 270, will be described with reference to FIG. 9.

Figure 7:
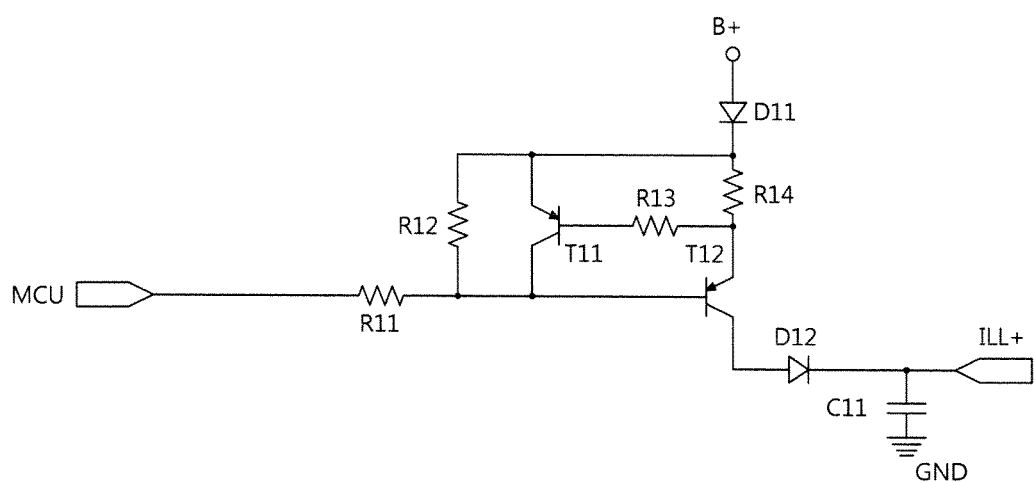
FIGS. 7 and 8 are circuit configuration diagrams of the controller of the vehicle according to the exemplary embodiment of the inventive concept.

FIG. 7 is an example of a first circuit unit for outputting a light reduction (that is, target luminance) adjustment signal.

The first circuit unit includes a first resistor R11 having one side connected to a transmission port MCU of the controller, a second resistor R12 connected to the other side of the first resistor R11, a first switching element T11 having an emitter connected to one side of the second resistor R12 and a collector connected to the other side of the second resistor R12, a third resistor R13 connected to a base of the first switching element T11, and a fourth resistor R14 arranged between the emitter of the first switching element T11 and the third resistor R13.

In addition, the first circuit unit includes an external power supply B+, a first diode D11 arranged on one side of a fourth resistor R14, a second switching element T12 having the emitter connected to the other side of the fourth resistor R14 and the base connected to the collector of the first switching element T11, a second diode D12 having an anode connected to the collector of the second switching element T12 and a cathode connected to an output port ILL+ for outputting a pulse width modulation (PWM) signal, and a first capacitor C11 arranged between the cathode of the second diode D12 and the ground.

Here, the first switching element T11 and the second switching element T12 are NPN type transistors.

This first circuit unit is a high active circuit. When a high signal is output from the transmission port MCU of the controller and a voltage and a current are applied from the external power supply, the second switching element T12 is turned on. At this time, the high signal is output to the output port ILL+.

In addition, after determining an output time-point of a low signal based on the target luminance, the controller outputs the low signal through the transmission port MCU when it is determined that the output time-point of the low signal is reached. At this time, the second switching element T12 is turned off and the low signal is output to the output port ILL+.

By iterating the above process, the first circuit unit outputs a duty pulse signal corresponding to light reduction.

The first switching element T11 prevents the circuit from being internally short-circuited.

Figure 8:
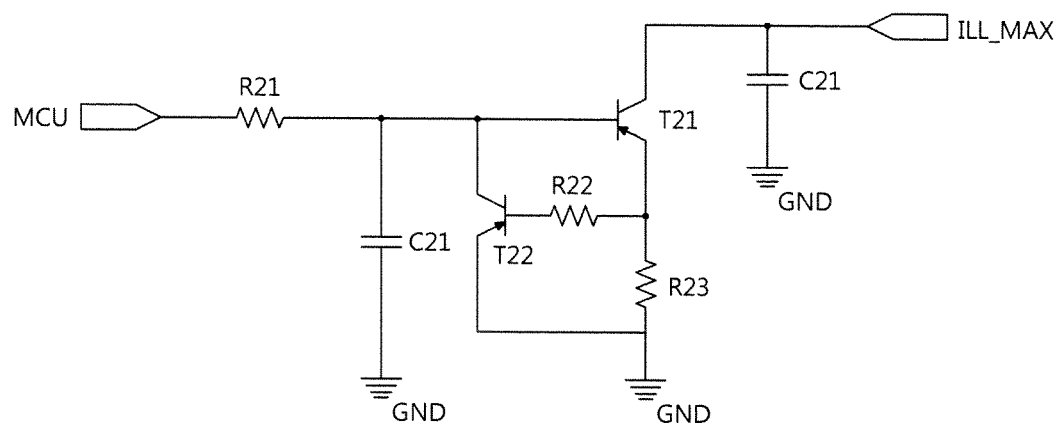

FIG. 8 is an example of a second circuit unit for outputting an adjustment signal of maximum luminance.

The second circuit unit includes a first resistor R21 having one side connected to a transmission port MCU of the controller, a first capacitor C21 between the other side of the first resistor R21 and the ground, a first switching element T21 having the base connected to the other side of the first resistor R21 and the collector connected to an output port ILL_MAX, and a second capacitor C22 connected between the collector of the first switching element T21 and the ground.

The second circuit unit includes a second switching element T22 having the collector connected to the other side of the first resistor R21 and the base connected to the ground, a second resistor R22 connected to the base of the second switching element T22, and a third resistor R23 connected between the emitter of the first switching element T21 and the ground.

Here, the first switching element T21 is a PNP type transistor and the second switching element T22 is an NPN type transistor.

This second circuit unit is a low active circuit. When a low signal is output from the transmission port MCU of the controller, the first switching element T21 is turned off. At this time, the low signal is output to the output port ILL+.

The second switching element T22 prevents the circuit from being internally short-circuited.

Figure 9:
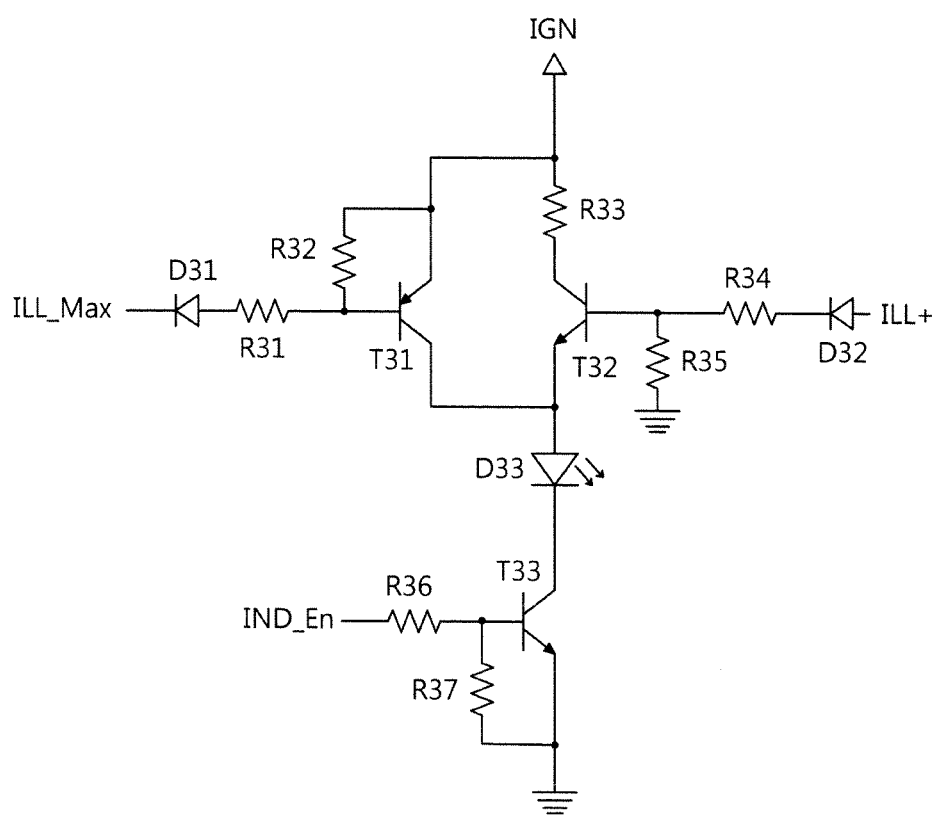
FIG. 9 is a circuit configuration diagram of a second lighting unit configured to communicate with the controller of the vehicle according to the exemplary embodiment of the inventive concept.

FIG. 9 is an example of a third circuit unit of a second lighting unit for receiving an adjustment signal of a controller and adjusting luminance.

The third circuit unit includes a first diode D31 connected to a first input port ILL_MAX to which the adjustment signal corresponding to the maximum luminance is input, a first resistor R21 connected to the anode of the first diode D31, a second resistor R32 connected to the other side of the first resistor R21, and a first switching element T31 having a base connected to one side of the second resistor R32 and the emitter connected to other sides of the second resistor R32 and an ignition port IGN.

The third circuit unit includes a third resistor R33 having one side connected to the ignition port IGN, a second switching element T32 having the collector connected to another side of the third resistor R33 and the emitter connected to the collector of the first switching element, a fourth resistor R34 connected to a base of the second switching element T32, a fifth resistor R35 connected between the ground and a point at which the base of the second switching element T32 and the fourth resistor R34 meet, and a second diode D32 connected to the fourth resistor R34 and connected to a second input port ILL+ to which a light-reduction adjustment signal is input.

In addition, the third circuit unit includes an LED D33 having the anode connected to a point at which the collector of the first switching element T21 and the emitter of the second switching element T32 meet, a third switching element 133 having the collector connected to the cathode of the LED D33 and the emitter connected to the ground, a sixth resistor R36 arranged between the base of the third switching element T33 and an enable switch IND_EN, and a seventh resistor R37 arranged between a point between the base of the third switching element T33 and the sixth resistor R36 and the ground and the ground.

When the low signal is input through the first input port ILL_MAX (in the daytime mode) in this third circuit unit, the first switching element T31 is turned on. At this time, the current flows through the LED D33, thereby operating the second lighting unit 220 at the maximum luminance.

On the other hand, when a high signal is input through the first input port ILL_MAX (in the nighttime mode) in this third circuit unit, the first switching element T31 is turned off. When the high signal is input to the second input port ILL+, the second switching element T32 is turned on. When the low signal is input to the second input port ILL+ based on the duty ratio, the second switching element T32 is turned off and hence the current to flow through the LED D33 is adjusted.

That is, the third circuit unit turns off the second switching element T32 in a cycle corresponding to light reduction, and hence, the current to flow through the LED D33 is adjusted. Accordingly, the brightness of the LED D33 may be reduced. Here, the LED D33 corresponds to a lamp of the second lighting unit 220.

The enable switch IND_EN is used to control the ON/OFF operation of the second lighting unit 220 and prevents the second lighting unit 220 from being adjusted to the maximum brightness or target brightness by turning off the third switching element T33 at the time of OFF.

In this manner, because the second lighting unit 220 adjusts luminance based on a command of the controller of the cluster, it is possible to reduce a passive element and a wire and simultaneously simplify a circuit, and it is possible to reduce manufacturing cost according to the simplification of the circuit.

Figure 10:
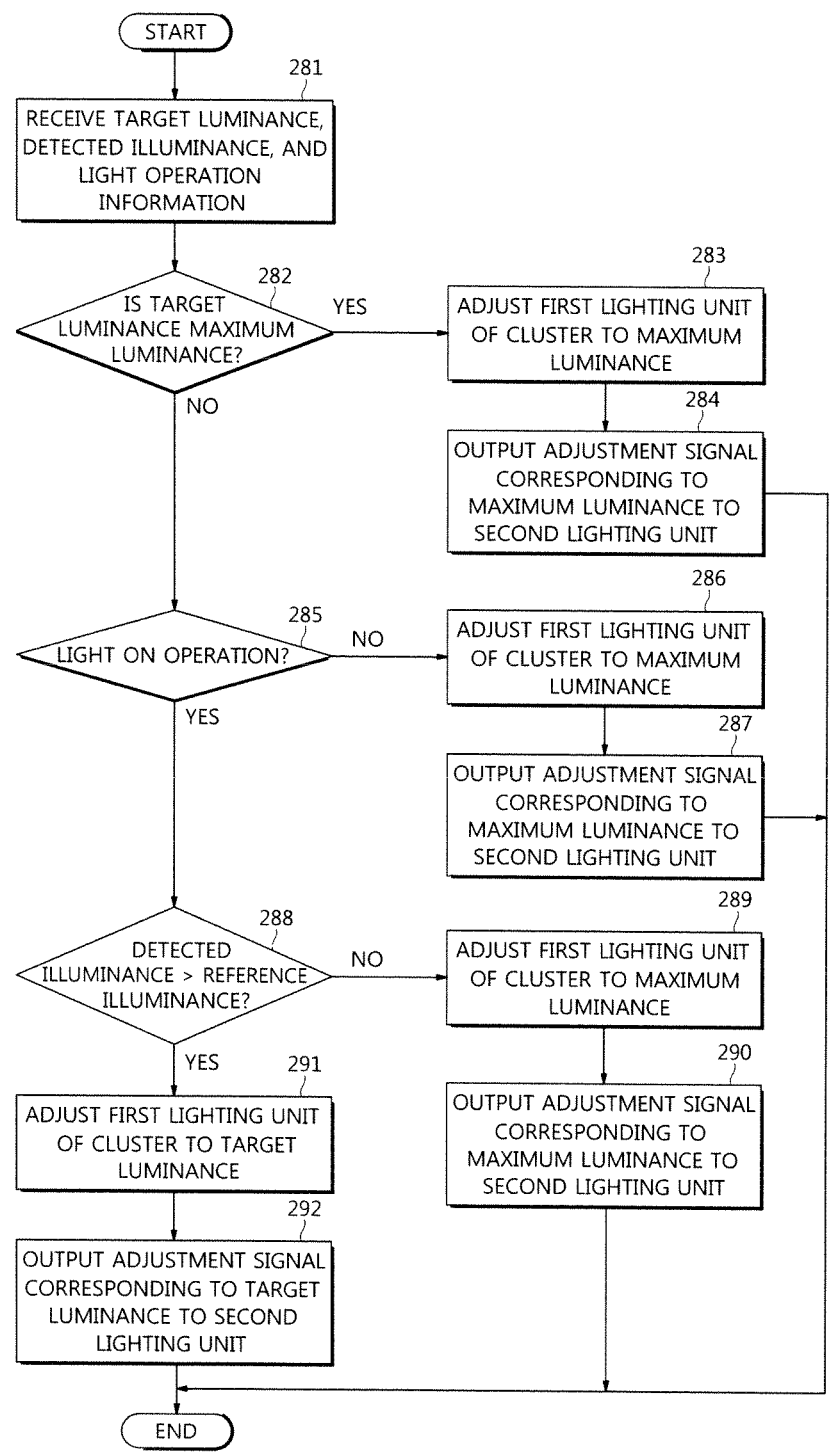
FIG. 10 is a control flowchart of the vehicle according to the exemplary embodiment of the inventive concept.

FIG. 10 is a flowchart of the vehicle according to the embodiment. The flowchart will be described with reference to FIGS. 11 and 12.

When the vehicle is started, luminance of the first lighting unit 210 of the cluster 123 and the second lighting unit 220 and the third lighting unit 230 of the center fascia 125 is adjusted.

Also, when the door is open, the vehicle may adjust the luminance of the first lighting unit 210 of the cluster 123 and the second lighting unit 220 and the third lighting unit 230 of the center fascia 125.

This will be more specifically described.

The vehicle detects illuminance, recognizes operation information of the light, identifies target luminance input through the luminance input 240, and transmits the identified target luminance to the controller 270 of the cluster.

At this time, the cluster receives the detected illuminance, the target luminance, and the operation information of the light through the CAN communication (281).

The cluster of the vehicle compares the target luminance to the maximum luminance (282). At this time, when it is determined that the target luminance is the same as the maximum luminance, the cluster of the vehicle adjusts the first lighting unit 210 to the maximum luminance (283) and outputs an adjustment signal corresponding to the maximum luminance to the second lighting unit 220 (284).

When the adjustment signal is received from the cluster, the second lighting unit 220 determines whether the received adjustment signal is an adjustment signal corresponds to the maximum luminance and adjusts a lamp of the plurality of buttons provided in the center fascia 125 to the maximum luminance when the received adjustment signal is the adjustment signal corresponding to the maximum luminance. The cluster of the vehicle determines whether the light is in the ON state (285) when the target luminance is not the maximum luminance, adjusts the first lighting unit 210 to the maximum luminance (286) by determining the operation mode as the daytime mode when it is determined that the light is in the OFF operation state, and outputs an adjustment signal corresponding to the maximum luminance to the second lighting unit 220 (287).

When the adjustment signal is received from the cluster, the second lighting unit 220 determines whether the received adjustment signal is an adjustment signal corresponding to the maximum luminance and adjusts the lamp of the plurality of lamps provided in the center fascia 125 to the maximum luminance when it is determined that the received adjustment signal is the adjustment signal corresponding to the maximum luminance.

The cluster of the vehicle compares the detected illuminance to the reference illuminance (288) when it is determined that the light is in the ON operation state in a state in which the target luminance is not the maximum luminance, adjusts the first lighting unit 210 to the maximum luminance (289) by determining the operation mode as the daytime mode when it is determined that the detected illuminance is greater than or equal to the reference illuminance, and outputs the adjustment signal corresponding to the maximum luminance to the second lighting unit 220 (290).

When the adjustment signal is received from the cluster, the second lighting unit 220 determines whether the received adjustment signal is an adjustment signal corresponding to the maximum luminance and adjusts the lamp of the plurality of lamps provided in the center fascia 125 to the maximum luminance when it is determined that the received adjustment signal is the adjustment signal corresponding to the maximum luminance.

In this manner, the vehicle maintains the luminance of the first and second lighting units 210 and 220 as the maximum luminance to improve visibility of the driver in the daytime mode.

The vehicle adjusts the luminance of the first and second lighting units 210 and 220 to the maximum luminance for improvement of visibility of the driver even when target luminance set by the user is not the maximum luminance in the daytime mode.

On the other hand, when it is determined that the detected illuminance is less than the reference illuminance in a state in which the target luminance is not the maximum luminance and the light is in the ON operation state, the cluster of the vehicle adjusts the first lighting unit 210 to the target luminance (291) and outputs an adjustment signal corresponding to the target luminance to the second lighting unit 220 (292).

Here, the step 292 of outputting the adjustment signal corresponding to the target luminance to the second lighting unit 220 includes outputting a duty pulse signal corresponding to the target luminance, that is, reduced luminance.

At this time, the second lighting unit 220 may emit light at the target luminance by reducing the luminance based on the duty pulse signal transmitted from the cluster 123.

As illustrated in FIG. 11, the cluster 123 determines the luminance of the first and second lighting units 210 and 220 as the maximum luminance regardless of ON/OFF of the light and illuminance when the maximum luminance is set.

In addition, the cluster 123 determines the luminance of the first and second lighting units 210 and 220 as the maximum luminance regardless of illuminance when the light is in the OFF state in a state in which the maximum luminance is not set.

In addition, when the maximum luminance is not set and the light is in the OFF state, the cluster 123 determines whether the operation mode is the daytime mode based on the illuminance. At this time, the cluster determines the luminance of the first and second lighting units 210 and 220 as the maximum luminance when it is determined that the operation mode is the daytime mode, and determines the luminance of the first and second lighting units 210 and 220 as the target luminance when it is determined that the operation mode is the nighttime mode.

Here, the target luminance is lower luminance than the maximum luminance.

The cluster 123 may output the ON signal corresponding to the maximum luminance and the OFF signal corresponding to the target luminance as the adjustment signal, wherein the OFF signal may have the PWM signal corresponding to the target luminance.

As illustrated in FIG. 12, the second lighting unit 220 may receive the ON signal corresponding to the maximum luminance and the OFF signal corresponding to the target luminance as the adjustment signal, adjust the luminance to daytime brightness when the ON signal is received, and adjust the luminance to nighttime brightness when the OFF signal is received.

In addition, the vehicle turns off a button lighting unit of the cluster 123 and the third lighting unit 230 provided in the center fascia 125 or the door in the daytime mode and turns on the button lighting unit of the cluster and the third lighting unit 230 provided in the center fascia 125 or the door and automatically turns on the light in the nighttime mode.

The vehicle may also perform ON control to luminance preset in the daytime mode when the first lighting unit 210 of the cluster 123 and the second lighting unit 220 of the center fascia 125 are turned off in the daytime mode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system for adjusting brightness of vehicle lighting comprising:
   a first lighting unit provided in a cluster;
   a luminance input configured to receive an input of a target luminance of the first lighting unit,
   a second lighting unit provided in a center fascia;
   a recognizer configured to recognize ON and OFF operations of a light provided in an exterior of vehicle;
   a detector configured to detect an external illuminance; and
   a controller configured to adjust a luminance of the first and second lighting units based on operation information of the light and the external illuminance,
   wherein the controller adjusts the luminance of the first and second lighting units to a maximum luminance when the light is in an ON operation state and the detected external illuminance is greater than or equal to a reference illuminance,
   adjusts the luminance of the first and second lighting units to the maximum luminance when the light is in an OFF operation state, and
   adjusts the luminance of the first and second lighting units to the target luminance of the first lighting unit when the light is in the ON operation state and the detected external illuminance is less than the reference illuminance.

2. The system according to claim 1,
   wherein the controller adjusts the luminance of the first and second lighting units to the maximum luminance when the target luminance is the maximum luminance.

3. The system according to claim 1, wherein the controller outputs an adjustment signal corresponding to the maximum luminance to the second lighting unit when the luminance of the first lighting unit is the maximum luminance and outputs an adjustment signal corresponding to a luminance reduced by a predetermined magnitude to the second lighting unit when the luminance of the first lighting unit is the reduced luminance, and
   wherein the second lighting unit is adjusted to the maximum luminance when the luminance of the first lighting unit is the maximum luminance, and the second lighting unit is adjusted to the reduced luminance when the luminance of the first lighting unit is the reduced luminance.

4. A vehicle having a system for adjusting brightness of vehicle lighting, comprising:
   a detector configured to detect an external illuminance;
   a cluster having a first lighting unit and configured to receive ON and OFF operation information of a light provided in an exterior of vehicle and the external illuminance, to determine a luminance of the first lighting unit based on the received light operation information and the external illuminance, to control luminance of the first lighting unit to the determined luminance, and to output an adjustment signal corresponding to the determined luminance;
   a luminance input configured to receive an input of a target luminance of the first lighting unit; and
   a second lighting unit configured to adjust the luminance of the second lighting unit based on the adjustment signal output from the cluster,
   wherein the cluster adjusts the luminance of the first lighting unit to the target luminance when the light is in an ON operation state and the detected external illuminance is less than a reference illuminance.

5. The vehicle according to claim 4, wherein the second lighting unit is provided in a center fascia.

6. The vehicle according to claim 4, wherein the cluster receives the ON and OFF operation information of the light and the external illuminance using controller area network (CAN) communication.

7. The vehicle according to claim 4, wherein the cluster adjusts the luminance of the first lighting unit to the maximum luminance when the light is in the ON operation state and the detected external illuminance is greater than or equal to the reference illuminance.

8. The vehicle according to claim 4, wherein the cluster adjusts the luminance of the first lighting unit to the maximum luminance when the light is in an OFF operation state.

9. The vehicle according to claim 4,
wherein the cluster adjusts the luminance of the first lighting unit to the maximum luminance when the target luminance is the maximum luminance.

10. The vehicle according to claim 4, wherein the cluster outputs an adjustment signal corresponding to a maximum luminance to the second lighting unit when the luminance of the first lighting unit is the maximum luminance, and outputs an adjustment signal corresponding to a luminance reduced by a predetermined magnitude to the second lighting unit when the luminance of the first lighting unit is the reduced luminance.

11. The vehicle according to claim 4, further comprising a third lighting unit configured to supply light to a character engraved on each of a plurality of buttons on the third lighting unit,
wherein the cluster outputs an OFF signal to the third lighting unit when the detected external illuminance is greater than or equal to the reference illuminance, and outputs an ON signal to the third lighting unit when the detected external illuminance is less than the reference illuminance.

12. The vehicle according to claim 4, wherein the cluster outputs an adjustment signal corresponding to the maximum luminance to the second lighting unit when the detected external illuminance is greater than or equal to the reference illuminance, and outputs an adjustment signal corresponding to a luminance lower than the maximum luminance to the second lighting unit when the detected external illuminance is less than the reference illuminance.

13. A control method for lighting device of a vehicle, comprising steps of:
receiving operation information of a light provided in an exterior of the vehicle and a detected external illuminance;
adjusting a luminance of a first lighting unit provided in a cluster based on the operation information of the light and the detected external illuminance; and
outputting an adjustment signal corresponding to the adjusted luminance of the first lighting unit to a second lighting unit provided in a center fascia;
wherein the step of adjusting the luminance of the first lighting unit includes steps of: receiving an input of a target luminance; and adjusting the luminance of the first lighting unit to the target luminance when the light is in an ON operation state and the detected external illuminance is less than a reference illuminance.

14. The control method according to claim 13, wherein the step of outputting the adjustment signal includes steps of:
comparing the detected external illuminance to the reference illuminance;
outputting an adjustment signal corresponding to a maximum luminance to the second lighting unit when the detected external illuminance is greater than or equal to the reference illuminance; and
outputting an adjustment signal corresponding to a luminance lower than the maximum luminance to the second lighting unit when the detected external illuminance is less than the reference illuminance.

15. The control method according to claim 13, wherein the step of adjusting the luminance of the first lighting unit includes a step of:
adjusting the luminance of the first lighting unit to a maximum luminance when the light is in the ON operation state and the detected external illuminance is greater than or equal to the reference illuminance.

16. The control method according to claim 13, wherein the step of adjusting the luminance of the first lighting unit includes a step of:
adjusting the luminance of the first lighting unit to a maximum luminance when the light is in an OFF operation state.

17. The control method according to claim 13, wherein the step of adjusting the luminance of the first lighting unit includes a step of: adjusting the luminance of the first lighting unit to a maximum luminance when the target luminance is the maximum luminance.

\* \* \* \* \*